Sept. 16, 1947.  J. A. BENOIT  2,427,380
CONDIMENT HOLDER
Filed May 11, 1944
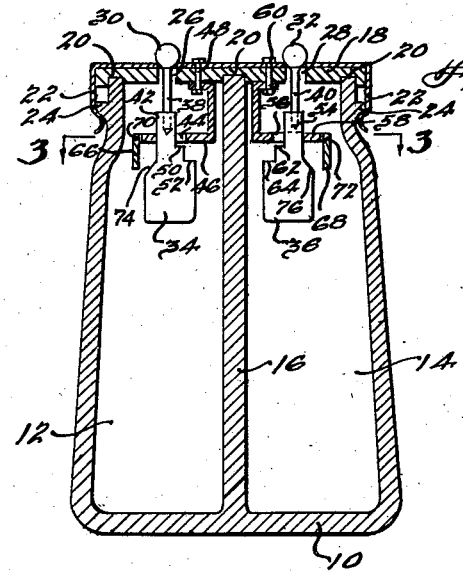
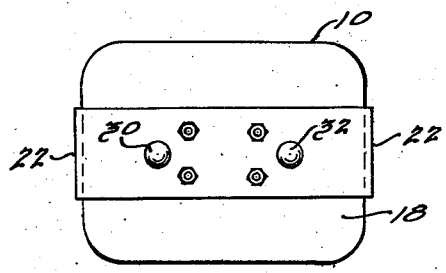
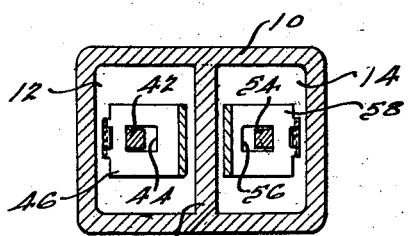
Inventor
Joseph A. Benoit,
By A. E. Wilson.
Attorney Patented Sept. 16, 1947

2,427,380

UNITED STATES PATENT OFFICE 2,427,380

CONDIMENT HOLDER

Joseph A. Benoit, Many, La.

Application May 11, 1944, Serial No. 535,090

3 Claims. (Cl. 65—45)

This invention relates to condiment holders and more particularly to an improved condiment dispenser having a plurality of selectively operable condiment chambers.

There has been a long felt need for a condiment holder having separate compartments and so constructed that a desired condiment such as salt, pepper or other seasoning or flavoring ingredients can be selectively dispensed. Devices of this type heretofore developed have been cumbersome and inefficient in operation because of the difficulty of obtaining positive selective control to permit one condiment to be dispensed while other condiment chambers are maintained securely closed.

An object of this invention is therefore to provide an improved condiment holder having a plurality of separate compartments controlled by automatically operable means to permit selective dispensing of a desired condiment while other condiment chambers are maintained securely closed.

A further object of the invention resides in the provision of an improved automatic valving mechanism for selectively controlling separate condiment chambers positioned in a unitary holder.

Another object of the invention is to provide an improved salt and pepper dispenser having chambers controlled by gravity actuated valves to maintain each of the compartments securely sealed when not in use and to permit selective dispensing of the ingredients from either of the chambers while the other chamber is maintained securely closed by the gravity actuated valving mechanism.

Other objects and advantages of this invention will be apparent from the following detailed description considered in connection with the accompanying drawings, submitted for purposes of illustration only and not intended to define the scope of the invention, reference being had for that purpose to the subjoined claims.

In the drawings wherein similar reference characters refer to similar parts throughout the several views:

Fig. 1 is a vertical elevation through a condiment dispenser embodying the present invention.

Fig. 2 is a plan view of the device illustrated in Fig. 1.

Fig. 3 is of sectional view taken substantially on the line 3—3 of Fig. 1 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to the drawings it will be observed that a condiment dispenser 10 is provided with spaced chambers 12 and 14 separated by a partition wall 16 to form independent chambers for a plurality of condiments such for example as salt, pepper and other seasoning materials. A cover 18 is provided to over-lie the open upper ends of the chambers 12 and 14, and may be provided with grooves 20 to engage the upper edges of the holder 10 and partition 16 as illustrated in Fig. 1. If desired suitable sealing material may be positioned in the grooves 20 to insure complete sealing of the chambers 12 and 14. The cover 18 is provided with downwardly extended tongues 22 adapted to over-lie spaced protuberances 24 to securely clamp the cover 18 to the holder 10.

The cover 18 is provided with spaced openings 26 and 28 communicating with each of the chambers 12 and 14 respectively to permit the stored condiments to be dispensed from their associated compartments. The openings 26 and 28 may be controlled by suitable valve members 30 and 32 respectively. If desired the valve members 30 and 32 may be formed of non-sweating material to prevent the attraction of moisture which might interfere with the dispensing of the condiments.

Each of the valves 30 and 32 is controlled by gravity actuated means to selectively release its associated opening while the other valve member is maintained in the closed position. Weights 34 and 36 connected to the valves 30 and 32 through projections 38 and 40 respectively are provided to automatically control the valves. The weight 34 has a neck portion 42 projecting through an aperture 44 in a member 46 secured to the cover 18 by means of spaced screws 48. The weight 34 is provided with vertically spaced shoulders 50 and 52 adapted to under-lie the lower surface of the member 46.

The weight 36 controlling the valve 32 of the chamber 14 is formed in a manner similar to the weight 34 controlling the valve 30, and has a neck portion 54 projecting through an opening 56 in a member 58 secured to the cover 18 by means of screws 60. The weight 36 has vertically spaced shoulders 62 and 64 positioned to under-lie the lower surface of the member 58.

The operation of this device is as follows. Condiments to be dispensed, such for example as salt and pepper are placed in the chambers 12 and 14 of the holder 10 and the closure 18 is secured in place by positioning the downwardly extending tongues 22 to over-lie the protuberances 24.

When it is desired to dispense salt from the chamber 12, the holder 10 is tipped toward the left as viewed in Fig. 1, whereupon the weight 34 controlling the valve 30 moves outwardly when the holder 10 is inverted to move the valve 30 to under cover the opening 26 to permit salt to be dispensed therethrough. The shoulder 50 of the weight 34 is so proportioned as to slide through the opening 44 in the member 46 to permit the valve 30 to open. The shoulder 52 engages the lower surface of the member 46 to limit the opening movement of the valve 30.

As the holder 10 is oscillated to the left to dispense salt from the chamber 12 the weight 36 controlling the valve 32 of the pepper compartment 14 is moved by gravity toward the partition 16 whereupon the shoulder 62 of the weight 36 is positioned underneath the lower surface of the member 58 to prevent the valve 32 from moving outwardly to maintain the pepper compartment 14 securely closed. When the desired quantity of salt has been dispensed the holder 10 is positioned in the upright position as illustrated in Fig. 1, whereupon the weight 34 moves the valve 30 to close the opening 26.

When it is desirable to dispense pepper from the compartment 14 the holder 10 is oscillated toward the right as viewed in Fig. 1 whereupon the shoulder 62 of the weight 36 projects through the opening 56 in the manner 58 to move the valve 32 to uncover the opening 28 to permit pepper to be dispensed from the chamber 14. The shoulder 64 of the weight 36 engages the lower surface of the member 58 to limit outward movement of the valve 32.

The initial movement of the holder 10 toward the right is effective to move the weight 34 in the salt chamber 12 toward the partition 16 whereupon the shoulder 50 of the weight 34 falls underneath the lower surface of the member 46 to maintain the valve 30 in the closed position with reference to the opening 26 to prevent salt from being dispensed from the chamber 12.

If desired movable baffle members 66 and 68 secured to the members 46 and 58 respectively by pins 70 and 72 may be provided to engage angularly disposed side walls 74 and 76 of the weights 34 and 36 respectively to exert a force tending to move the weights 34 or 36 toward the partition 16 when the holder 10 is actuated to dispense salt or pepper from the chambers 12 or 14 respectively.

I claim:

1. A dispenser for seasoning materials comprising a holder having spaced chambers, a closure having dispensing openings for each chamber, valves controlling the dispensing openings, weights controlling the valve members, each weight having a plurality of vertically spaced shoulders, control members having apertures positioned in each chamber to permit one of the spaced shoulders to slide through the aperture to separate its valve member from its dispensing opening to discharge seasoning material from its associated chamber, the corresponding vertically spaced shoulder of the other weight being moved by gravity underneath the bottom surface of its associated control member to maintain another of the valve members in the closed position relative to its dispensing opening.

2. A dispenser for seasoning materials comprising a holder having spaced chambers, a closure having dispensing openings for each chamber, valves controlling the dispensing openings, weights controlling the valve members, each weight having a plurality of vertically spaced shoulders, control members including baffles having apertures positioned in each chamber to permit the upper of the spaced shoulders to slide through the aperture to separate its valve member from its dispensing opening to discharge seasoning material from its associated chamber, the corresponding vertically spaced shoulder of the other weight being moved by gravity in the apertured baffle underneath the bottom surface of its associated baffle to maintain another of the valve members in the closed position relative to its dispensing opening.

3. A condiment dispenser comprising a holder having spaced chambers to receive different condiments to be selectively dispensed, a closure for each chamber having a dispensing outlet, a valve controlling each outlet, gravity actuated means controlling each valve including a block of material secured to each valve member and having vertically spaced notches, a member positioned in each chamber to selectively engage one or the other of the vertically spaced notches of its associated block to maintain one valve closed and to permit another valve to move longitudinally of its associated member to open the dispensing outlet of its associated chamber when the dispenser is moved to an angularly inclined substantially inverted dispensing position.

JOSEPH A. BENOIT.

REFERENCES CITED

The following references are of record in the file of this patent:

UNITED STATES PATENTS

| Number | Name | Date |
| --- | --- | --- |
| 1,326,524 | Nierodka | Dec. 30, 1919 |
| 1,772,041 | Harris | Aug. 5, 1930 |
| 2,021,049 | Currie | Nov. 12, 1935 |
| 972,339 | Comstock | Oct. 11, 1910 |
| 2,205,040 | Kasin | June 18, 1940 |
| 417,981 | Boston | Dec. 24, 1889 |
| 1,980,863 | Ingold | Nov. 13, 1934 |
| 2,076,233 | Grantonic | Apr. 6, 1937 |
| 855,273 | Buckland | May 28, 1907 |

FOREIGN PATENTS

| Number | Country | Date |
| --- | --- | --- |
| 420,844 | France | Dec. 5, 1910 |
| 331,255 | Germany | Jan. 4, 1921 |